(No Model.)
W. M. WELCH.
WHEEL SCRAPER.
No. 321,557.  Patented July 7, 1885.
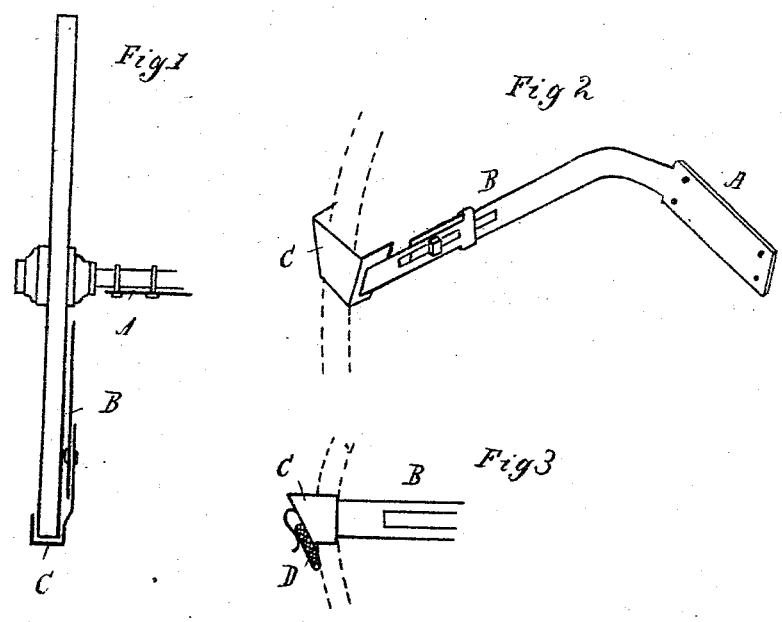

UNITED STATES PATENT OFFICE.

WILLIAM M. WELCH, OF WINDSOR, ONTARIO, CANADA.

WHEEL-SCRAPER.

SPECIFICATION forming part of Letters Patent No. 321,557, dated July 7, 1885.

Application filed March 5, 1885. (No model.)

*To all whom it may concern:*

Be it known that I, WILLIAM M. WELCH, of Windsor, in the county of Essex and Province of Ontario, Canada, have invented new and useful Improvements in Scrapers; and I do hereby declare that the following is a full, clear, and exact description thereof, reference being had to the accompanying drawings, which form a part of this specification.

This invention relates to certain new and novel improvements in the construction of scrapers for wagon-wheels; and the invention consists in the combination and arrangement of parts, as more fully hereinafter set forth.

Figure 1 is a plan. Fig. 2 is a detached perspective view, and Fig. 3 is a side elevation.

In the accompanying drawings, which form a part of this specification, A represents the fastening-plate for securing the device to the axle of the wheel.

B is an arm, made adjustable, so that it can be lengthened or shortened, to suit wheels of different diameter.

C represents the scraper-iron, made U-shaped and flaring, and D is a flap of rubber, leather, or other yielding material secured to the scraper-iron so that it will scrape the tire of the wheel.

It will be seen that this device can be readily attached to any vehicle by means of suitable clips. It is sufficiently adjustable within the usual range of the different sizes of wagon-wheels; and as the scraping is mainly done by the yielding leather or rubber flap attached to the scraper-head, all unnecessary friction and noise are avoided, and the tire is efficiently scraped before the mud has any chance to spatter the vehicle to the annoyance of the occupant.

What I claim as my invention is—

In a scraper, the adjustable arm, the fastening-plate, the flaring U-shaped scraper-iron, and the rubber or other yielding scraper, substantially as described.

WILLIAM M. WELCH.

Witnesses:
THOS. ROBERSON,
JOS. ANDERSON.